United States Patent [19]
McCarty

[11] 3,941,339
[45] Mar. 2, 1976

[54] MOUNTING ARRANGEMENT FOR FAN MOTOR

[75] Inventor: William J. McCarty, Louisville, Ky.

[73] Assignee: General Electric Company, Louisville, Ky.

[22] Filed: Apr. 25, 1975

[21] Appl. No.: 571,781

[52] U.S. Cl. .................... 248/15; 248/22; 310/51; 310/91; 248/358 R
[51] Int. Cl.² .................. F16F 15/00; H02K 5/24
[58] Field of Search ............. 248/7, 15, 20, 22, 26, 248/27, 56, 358 R; 16/2; 310/43, 51, 750, 91

[56] References Cited
UNITED STATES PATENTS

| | | | |
|---|---|---|---|
| 2,032,900 | 3/1936 | Alger | 230/272 |
| 2,096,139 | 10/1937 | Spahr | 248/20 |
| 2,104,106 | 1/1938 | Swennes | 192/68 |
| 2,628,771 | 2/1953 | Uhlrig | 230/259 |
| 3,128,999 | 4/1964 | Schmitt | 248/358 R |
| 3,154,704 | 10/1964 | Shaffer | 310/51 |
| 3,270,221 | 8/1966 | Shaffer | 310/51 |
| 3,270,222 | 8/1966 | Shaffer | 310/51 |
| 3,746,289 | 7/1973 | Johnson | 310/91 |
| 3,787,014 | 1/1974 | Story et al. | 310/91 |

FOREIGN PATENTS OR APPLICATIONS 1,077,780  8/1967  United Kingdom.................. 248/26

OTHER PUBLICATIONS

Akers et al., IBM Tech. Disc. Vol. 17, No. 1, 6–1974 "Noise Reducing System."

*Primary Examiner*—William H. Schultz
*Assistant Examiner*—Robert A. Hafer

[57] ABSTRACT

The present invention provides a motor mounting arrangement adapted to absorb motor torque vibration and impulses of an electric motor. The mounting arrangement converts the torque vibrations of the motor into controlled rotational movement caused by motor torque vibration while maintaining axial integrity of the motor shaft.

3 Claims, 5 Drawing Figures

MOUNTING ARRANGEMENT FOR FAN MOTOR

BACKGROUND OF THE INVENTION

1. Field Of The Invention

This invention relates generally to an arrangement for mounting an electric motor employed in driving a fan on a support barrier, and more specifically to provide a motor mounting arrangement that effectively reduces the torque vibrations imposed on the support barrier by the motor while eliminating lateral and longitudinal movement of the motor to maintain axial integrity of the shaft.

Due to their comparatively low cost it has become common practice to employ shaded pole induction motors for driving fans and blowers in room air conditioners. These motors, however, do not produce uniform torque for every position of the rotor. When shaded pole electric motors are employed in the capacity ranges used for driving room air conditioner fans and blowers, they characteristically produce torque pulses or vibrations of generally between 60 to 650 Hz. Motor torque vibration of those magnitudes cause hums or noise levels that are objectionable, this is especially true since air conditioners are generally used in living quarters and quite often are installed in sleeping areas.

The vibration dampening must be effective not only in controlling the noise level but as in the case of the present embodiment, when the motor is employed to drive a fan, axial integrity or lateral movement of the motor shaft from its rotational axis must be also controlled. In order to obtain high air moving efficiencies with a given fan size it is common practice to orient the fan in an orifice that is relatively close to the extreme ends of the fan blades. Accordingly the motor mounting arrangement while permitting vibration dampening movement must also prevent axial movement of the motor shaft to maintain design clearance and prevent contact between the fan and orifice during fan operation.

2. Description of the Prior Art

In some prior art attempts to minimize motor vibration, vibration isolating members are employed as described in U.S. Pat. No. 3,270,221—P. B. Shaffer. While the employment of such members is effective in isolating motor vibration they, however, permit lateral movement of the shaft relative to its rotational axis. Prior art attempts have also included incorporating resilient means on either end of a horizontally oriented electric motor as disclosed in U.S. Pat. No. 2,096,139—M. L. Spahr and in a vertically oriented electric motor as disclosed in U.S. Pat. No. 3,270,222 to P. B. Shaffer assigned to General Electric Company, assignee of the present invention.

SUMMARY OF THE INVENTION

By this invention there is provided a mounting arrangement for a motor supported in a support barrier. The motor is horizontally oriented with its shaft extending through a passageway in the support barrier. A mounting member is secured to the motor and includes a collar projecting circumferentially from an opening. The collar formed on the mounting member extends into the passageway in the support barrier and is dimensioned for rotational movement relative thereto. Also formed on the mounting member are a plurality of sleeves that are spaced equidistance from the collar and extend into complementary apertures in the support barrier. The sleeves are smaller in diameter than the complementary opening and resilient members are arranged between the sleeve and the apertures.

Accordingly the erratic torque output of the motor is absorbed by the resilient members with some rotational movement between the mounting member and the support barrier taken place between the collar and passageway.

It should be noted that the elimination of lateral movement of the motor shaft relative to its rotational axis, while effectively absorbing objectionable vibration permits close design tolerance between the extreme outer edges of the rotatably mounted fan and the stationary fan orifice.

BRIEF DESCRIPTION OF THE DRAWINGS

With reference to the accompanying drawings.

DESCRIPTION OF THE PREFERRED EMBODIMENT

Figure 1:
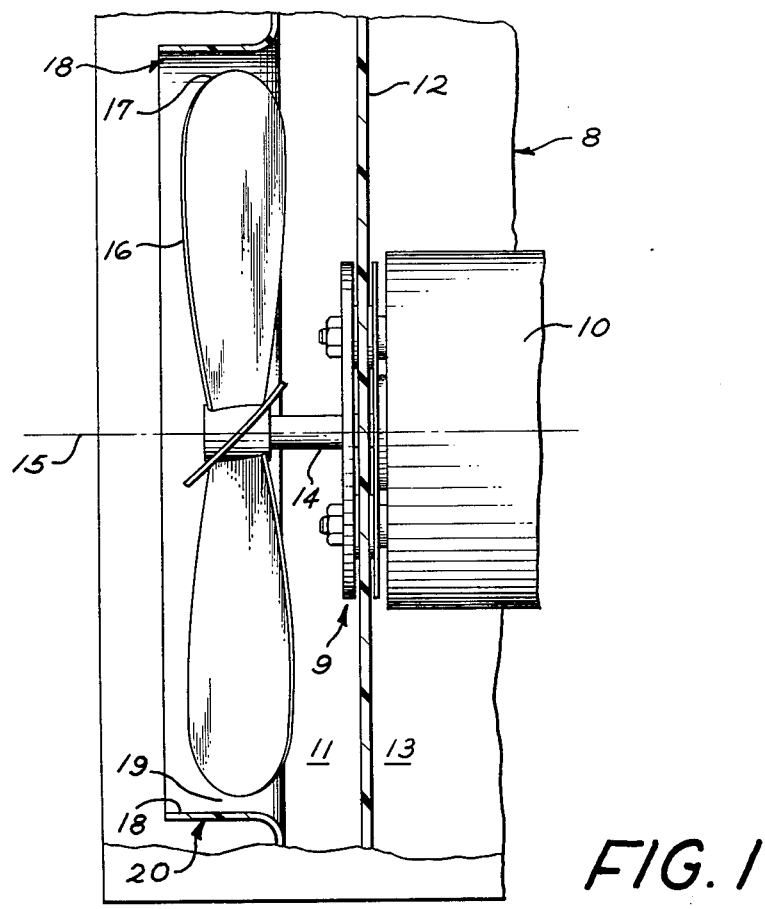
FIG. 1 is a fragmentary side elevational view of an air conditioning unit, showing the motor mounting arrangement of the present invention.
Figure 3:
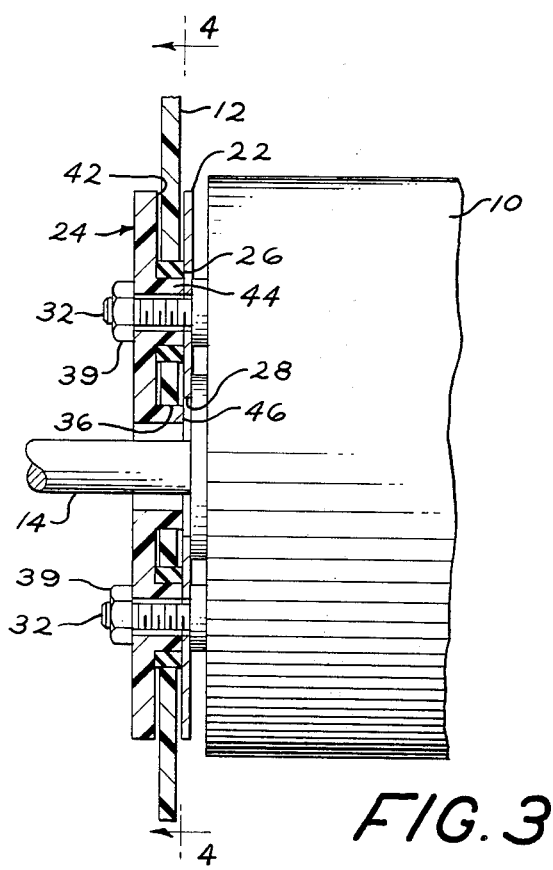
FIG. 3 is an enlarged sectional view of the embodiment of FIG. 2 showing details of construction.

Referring to the drawings and more particularly to FIG. 1, an air conditioning unit 8 includes a motor mounting arrangement 9 provided for an electric motor 10. The motor 10 employed in conjunction with the present invention may be of the shaded pole induction type. As shown in FIGS. 1 and 3, the motor 10 is supported on a support barrier or wall member 12 which may be the wall customarily dividing a room air conditioner 8 into indoor and outdoor sections 11 and 13 respectively. The motor 10 is arranged horizontally and includes a shaft 14 extending from at least one end thereof. The motor 10 in the present embodiment shown is mounted on the outdoor side 13 of barrier 12 with the shaft 14 extending therethrough to the indoor side 11 of the barrier 12.

Mounted for rotation with shaft 14 about its horizontal axis 15 is a fan 16 employed for drawing room air into the air conditioner through an evaporator (not shown) and back out into the room. The fan 16 is arranged in an orifice 18 in a member 20. The orifice 18 is dimensioned relative to the fan 16 so that a specific design clearance 19 is maintained between the radial or distal ends 17 of the fan 16 and the orifice 18. For maximum air moving efficiency of the fan 16 these clearances 19 are relatively small, and as a result axial orientation of the motor shaft 14 and fan 16 is extremely important. As will be hereinafter explained in detail, lateral movement of the shaft 14 from its axis 15 and fan 16 relative to the orifice 18 is undesirable in that it may cause the ends 17 of fan 16 to contact orifice 18 and result in damage to the contacting parts.

Accordingly by the present embodiments of the invention a motor support arrangement is provided that is vibration absorbing while at the same time maintaining the rotational axis orientation of the motor shaft.

Figure 2:
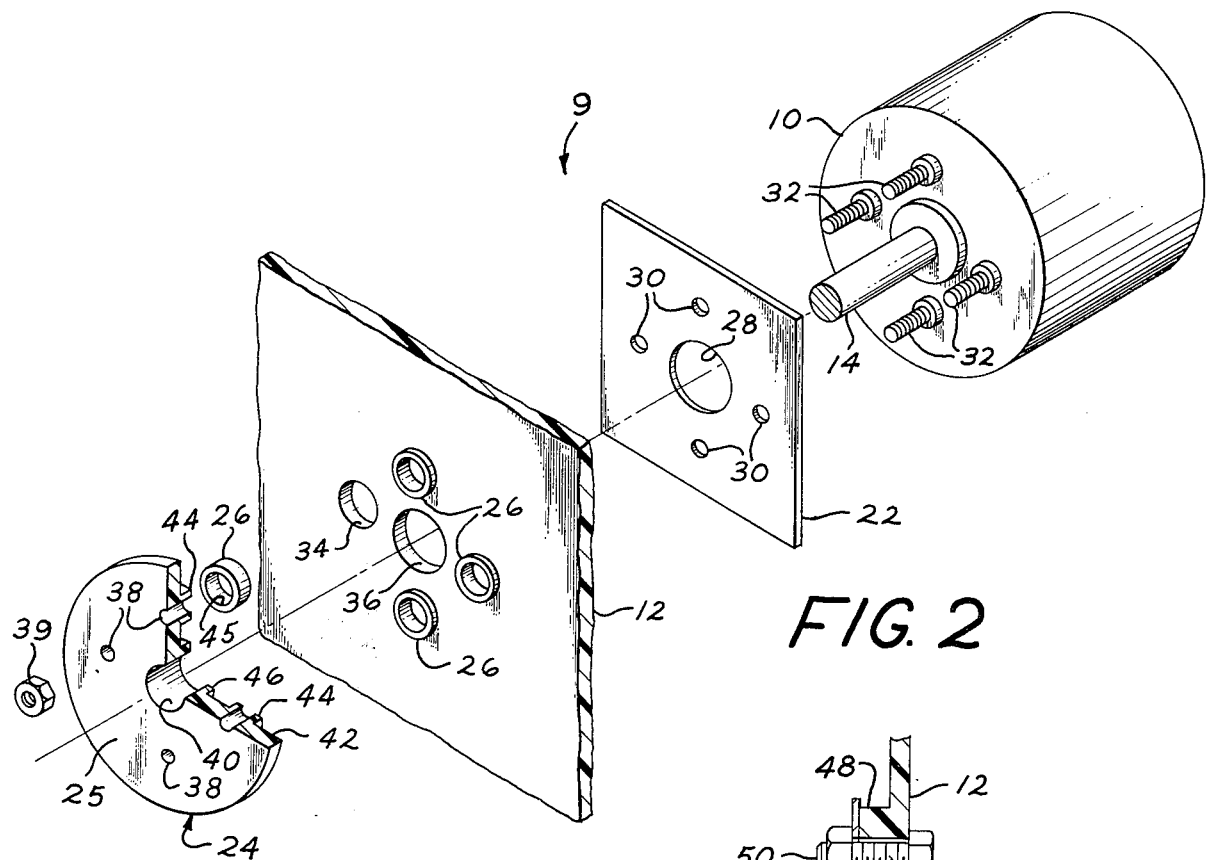
FIG. 2 is an exploded perspective view showing the details of the preferred embodiment of the motor mounting arrangement.

Referring to FIGS. 2 and 3 it will be seen that the motor mounting plate or arrangement 9 includes a retaining member 22, a mounting plate or member 24 including a body portion 25 and resilient members 26. The retaining member 22 is provided with a hole 28 through which shaft 14 extends and a plurality of holes 30 which are spaced and sized to receive support elements or studs 32 extending from the motor 10. The motor 10 including the member 22 is arranged on the barrier 12 with the support elements 32 extending through aligned apertures 34 and shaft 14 extending through a passageway 36 in the barrier 12. The mounting plate 24 includes openings 38 which align with opening 34 in barrier 12 and are sized to receive the motor support elements 32. The plate 24 also is provided with an opening 40 through which the motor shaft 14 passes through. It should be noted that the centers of members 32, openings 30, 34 and 38 are all in alignment and are spaced equidistance from the center of the shaft 14 when assembled. In other words, the center of the opening 30, 34 and 38 are all on the same radius which is generated from the rotational axis of shaft 14. The free end of studs 32 are provided with holding fasteners on nuts 39 which, as will be explained hereinafter, are effective in maintaining the member 24 securely against the motor 10. It should be noted (FIG. 3) that with the member 22 so secured to the motor 10 the barrier 12 is trapped between the retaining member 22 and the body portion 25 of member 24.

Means are provided by the present invention to provide spacing between the body portion 25 of member 24 and the retainer 22 to accommodate the thickness of the barrier 12 in a manner that permits, as will be hereinafter explained fully, rotational movement of the member 24 relative to the wall 12.

To this end provided on the inner surface 42 of body portion 25 of member 24 are projections or sleeve means 44 which are arranged circumferentially adjacent the periphery of openings 38 so the openings 38 extend uninterrupted through body portion 25 and sleeve 44. The longitudinal dimension of sleeves 44 are such that when they are up against the retainer 22 as shown in FIG. 3 slight clearance is maintained between the barrier 12 and the retainer 22 and member 24. It should be noted that the arrangement is such that longitudinal movement of motor 10 relative to barrier 12 is prevented by the member 22.

Figure 4:
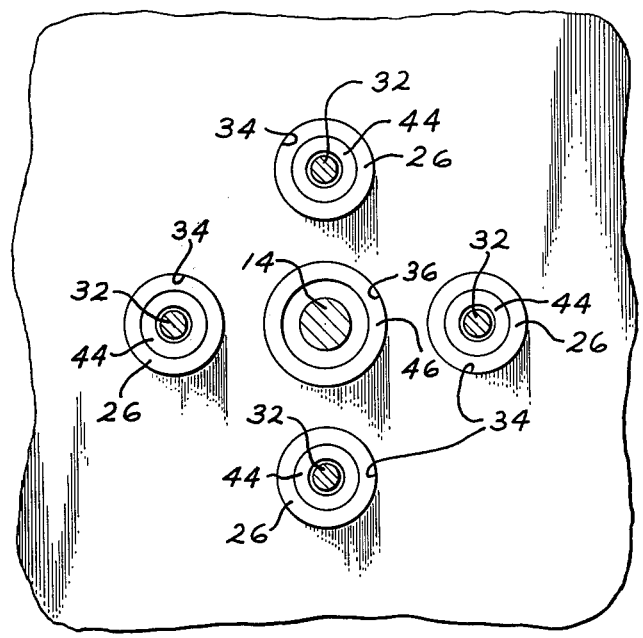
FIG. 4 is a sectional view taken along lines 4—4 of FIG. 3.

The diameter of the projections 44 are such, relative to the openings 34, that they are spaced from the walls of openings 34 as shown in FIG. 4 of the drawing.

Means are provided by the present embodiment of the invention to isolate the motor torque pulses or vibrations of the motor from the wall 12. Accordingly, resilient members 28 including a centrally located opening 45 which is dimensioned to receive the sleeve 44, are arranged between the sleeves 44 and the wall of openings 34. The sleeves 44 and more particularly the member 24 and motor 10 are isolated from the wall 12 by the resilient member 26 and accordingly the motor 10 moves relative to the stationary wall 12.

The motor mounting arrangement of the present invention permits the design tolerance 19 between the fan 16 and orifice 18 that provide, as mentioned hereinbefore, relatively high air flow efficiencies. Since the design tolerance 19 is generally close, the motor mounting arrangement while absorbing motor vibrations, must at the same time maintain the axial integrity of the shaft, that is lateral movement of the shaft 14 from its rotational axis must be prevented.

Means are therefore provided that are effective in allowing relative movement between the motor 14 and the wall 12 through the resilient member 26 in absorbing the motor torque vibrations and transferring them to rotational movement or vibrations about the rotational axis of the shaft 14.

To this end projecting longitudinally from the face 42 of body portion 28 is a collar 46 formed circumferentially adjacent the periphery of the opening 40. The collar 46 extends into the passageway 36 and its diameter is dimensioned to permit rotational movement of the member 24 relative to wall 12 while at the same time preventing lateral movement from the rotational axis 15 of the motor. In effect, as best shown in FIG. 4, the resilient members 26 have a durometer that is sufficient to absorb the motor torque vibrations, but movement between the member 24 and more specifically sleeves 44 is transmitted in an arcuate direction with the collar 46 rotating in the passageway 36. It should be understood that lateral movement of the shaft 14 relative to its rotational axis 15 is prevented, while rotational movement of motor 10 is permitted relative to wall 12 by the arrangement of collar 46 in passageway 36 and the clearance provided for wall 12 between member 22 and face 42 of member 24, with the resilient members 26 providing the necessary torque absorbing qualities between wall 12 and motor 10 to maintain the noise and vibration levels at an acceptable level.

In the embodiment shown in FIGS. 1-4 it should be understood that the retaining member 22 could be individual members positioned on each of the elements 32 rather than one member as illustrated. In fact if the face of motor 10 were flat the sleeve member 44 could be in engagement with the motor face and the wall 12 positioned between the motor and member 24.

Figure 5:
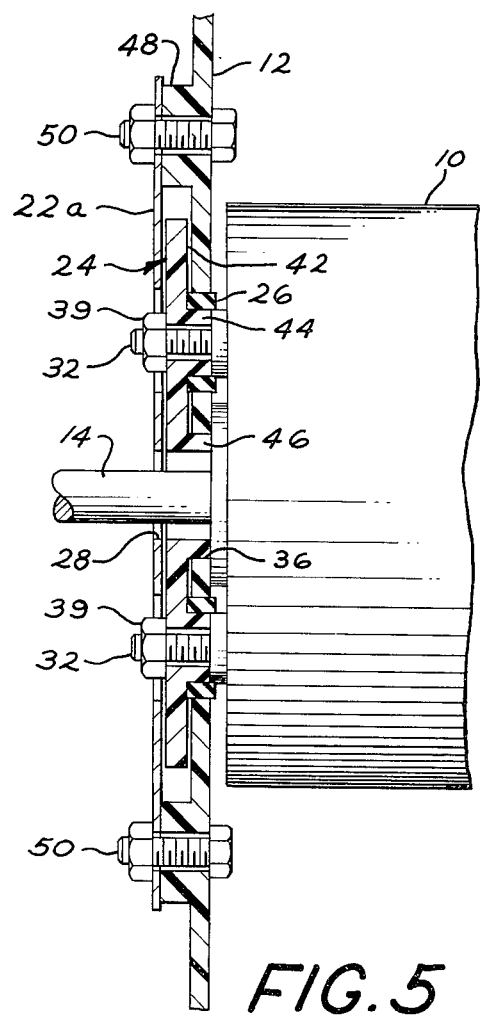
FIG. 5 is a view similar to FIG. 3 illustrating a second embodiment of the present invention.

Referring now to FIG. 5 there is shown a second embodiment of the invention wherein parts identical to those of the embodiment of FIGS. 1-4 are shown by the same numerals. In this embodiment the mounting arrangement between the member 24 and more specifically the collar 46 in passageway 36 of wall 12 and the arrangement of sleeve 44 and resilient member 26 in opening 34 remain the same. Longitudinal movement of the motor 10 is prevented by the retainer 22a in the same manner as retainer 22 in the embodiment of FIGS. 1-4 with the exception that it is located on the outer side of member 24. To this end the member 22a in FIG. 5 is spaced from the wall 12 by a plurality of bosses 48 dimensioned to accommodate the thickness of member 24 and to allow its movement in the manner of the embodiment of FIGS. 1-4. The member 22a as shown may be secured to the outer ends of bosses 48 by bolts 50.

It should be apparent to those skilled in the art that the embodiment described heretofore is considered to be the presently preferred form of this invention. In accordance with the Patent Statutes, changes may be made in the disclosed apparatus and the manner in which it is used without actually departing from the true spirit and scope of this invention.

What is claimed is:

1. A mounting arrangement for supporting a motor in a wall member comprising:

a. an electric motor having a rotatable shaft disposed in a substantially horizontal position and extending through a passageway in said wall member, and
   1. a plurality of support elements on said motor extending parallel to and spaced equidistance from said shaft,
   2. said support elements extending substantially centrally through aligned openings of equal number and spacing in said wall member;
b. a mounting member including a body portion having a collar projecting from said body portion arranged circumferentially around said shaft,
   1. said collar being disposed in said passageway, and of a dimension to permit rotational movement of said mounting member relative to said wall member,
   2. a plurality of sleeve means of equal number and spacing as said aligned openings projecting from said body portion through each said aligned opening of said wall into intimate contact with an opposing surface, and
   3. said sleeve means having centrally located holes extending longitudinally therethrough for receiving said support elements, and
   4. means arranged on said support elements for securing said mounting member against said motor with said wall member arranged between said motor and said mounting member;
c. retaining means being positioned so that said motor and mounting members are prevented from moving axially relative to said wall member; and
d. resilient means arranged between said sleeve means and their respective aligned openings for absorbing rotational motor torque vibration.

2. A mounting arrangement as recited in claim 1 wherein the retaining means comprises:
   a plate mounted on said motor so that said support wall is arranged between said plate and said mounting member, said opposing surface that said sleeve means is in intimate contact with being said plate.

3. A mounting arrangement as recited in claim 1 wherein the retaining means comprises:
   a plate mounted on said wall member and being spaced therefrom so that said mounting member is arranged between said plate and said wall member, said opposing surface that said sleeve means is in intimate contact with being said motor.

* * * * *